US007227997B2

(12) United States Patent
Saito

(10) Patent No.: US 7,227,997 B2
(45) Date of Patent: Jun. 5, 2007

(54) IMAGE RECOGNITION APPARATUS, IMAGE RECOGNITION METHOD, AND IMAGE RECOGNITION PROGRAM

(75) Inventor: Teruka Saito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 10 days.

(21) Appl. No.: 11/333,262

(22) Filed: Jan. 18, 2006

(65) Prior Publication Data
US 2007/0047815 A1 Mar. 1, 2007

(30) Foreign Application Priority Data
Aug. 24, 2005 (JP) ............................. 2005-242025

(51) Int. Cl.
*G06K 9/62* (2006.01)
(52) U.S. Cl. .................................... 382/209
(58) Field of Classification Search ................ 382/141, 382/181, 190, 195, 305, 306; 358/403, 453, 358/462; 235/385, 462.08, 462.09, 470, 235/487, 494; 707/2, 3, 100, 101, 104.1; 715/501.1, 505–515
See application file for complete search history.

(56) References Cited
U.S. PATENT DOCUMENTS
4,701,810 A * 10/1987 Ikemoto et al. ............. 358/296

| 5,542,002 | A | * | 7/1996 | Choate et al. | .............. 382/112 |
| 6,089,975 | A | * | 7/2000 | Dunn | .......................... 463/16 |
| 6,332,039 | B1 | * | 12/2001 | Bando et al. | ................ 382/195 |
| 6,834,288 | B2 | * | 12/2004 | Chen et al. | .............. 707/104.1 |
| 6,880,124 | B1 | * | 4/2005 | Moore | ........................ 715/511 |
| 6,948,792 | B2 | * | 9/2005 | Narusawa et al. | ............ 347/19 |
| 6,976,628 | B2 | * | 12/2005 | Krupa | ................... 235/462.08 |

FOREIGN PATENT DOCUMENTS
JP      A 06-266278     9/1994
JP      A 2004-152040   5/2004

* cited by examiner

*Primary Examiner*—Jose L. Couso
(74) *Attorney, Agent, or Firm*—Oliff & Berridge, PLC

(57) ABSTRACT

An image recognition apparatus, includes: a reading unit that reads an image on a paper script to acquire the image data from the paper script; an additional image extraction unit that extracts an additional image added to each predetermined area of an original image from the difference extraction result by taking a difference between an image data of the original image on the paper script and the image data acquired by the reading unit; an association unit that associates the additional image with the predetermined area; and an additional image selection unit that selects one of a plurality of additional images under prescribed decision conditions, when the plurality of additional images are associated with one predetermined area in accordance with an association made by the association unit.

9 Claims, 14 Drawing Sheets

FIG. 2

◯X EXTRACTED IMAGE    BINARIZED IMAGE

FIG. 13A EXAMINATION PAPER INFORMATION

FIG. 13B EXAMINATION PAPER

FIG. 13C OUTPUT RESULT

IMAGE RECOGNITION APPARATUS, IMAGE RECOGNITION METHOD, AND IMAGE RECOGNITION PROGRAM

BACKGROUND OF THE INVENTION

1. Field of the Invention

The present invention relates to an image recognition apparatus, an image recognition method and an image recognition program, and more particularly to an image recognition apparatus, an image recognition method and an image recognition program for reading and recognizing the image such as character or figure entered in the form.

2. Description of the Related Art

Generally, the educational teaching material such as a test answer sheet or exercise sheet is often used in the educational institutions such as schools or cram schools.

It is common practice that the student enters the answer on the educational teaching material (form), and the teacher grades the entered answer, employing the educational teaching material including the problem and the answer column.

SUMMARY OF THE INVENTION

Thus, the invention provides an image recognition apparatus, an image recognition method and an image recognition program in which the image rectified on the paper script such as educational teaching material can be securely recognized.

The invention may provide an image recognition apparatus, including: a reading unit that reads an image on a paper script to acquire the image data from the paper script; an additional image extraction unit that extracts an additional image added to each predetermined area of an original image from the difference extraction result by taking a difference between an image data of the original image on the paper script and the image data acquired by the reading unit; an association unit that associates the additional image with the predetermined area; and an additional image selection unit that selects one of a plurality of additional images under prescribed decision conditions, when the plurality of additional images are associated with one predetermined area in accordance with an association made by the association unit.

The invention may provide an image recognition method, including: reading an image on a paper script to acquire an image data from the paper script; extracting an additional image added to each predetermined area of an original image from a difference extraction result by taking a difference between an image data of the original image on the paper script and the image data acquired at the reading step; associating the additional image with the predetermined area; and selecting one of a plurality of additional images under prescribed decision conditions, when the plurality of additional images are associated with one predetermined area in accordance with an association result at the associating step.

The invention may provide a program product for enabling a computer to perform an image recognition, including: software instructions for enabling the computer to perform predetermined operations; and a computer-readable recording medium bearing the software instructions; wherein the predetermined operations include: extracting an additional image added to each predetermined area of an original image on a paper script from a difference extraction result by taking a difference between an image data of the original image and an image data acquired by reading an image on the paper script; associating the additional image with the predetermined area; and selecting one of a plurality of additional images under prescribed decision conditions, when the plurality of additional images are associated with one predetermined area in accordance with an association result at the associating step.

BRIEF DESCRIPTION OF THE DRAWINGS

Embodiment may be described in detail with reference to the accompanying drawings:

FIG. 2 is an explanatory view showing one specific example of the educational teaching material.

DETAILED DESCRIPTION OF THE INVENTION

The embodiments of the present invention will be described below in detail with reference to the drawings.

Figure 1:
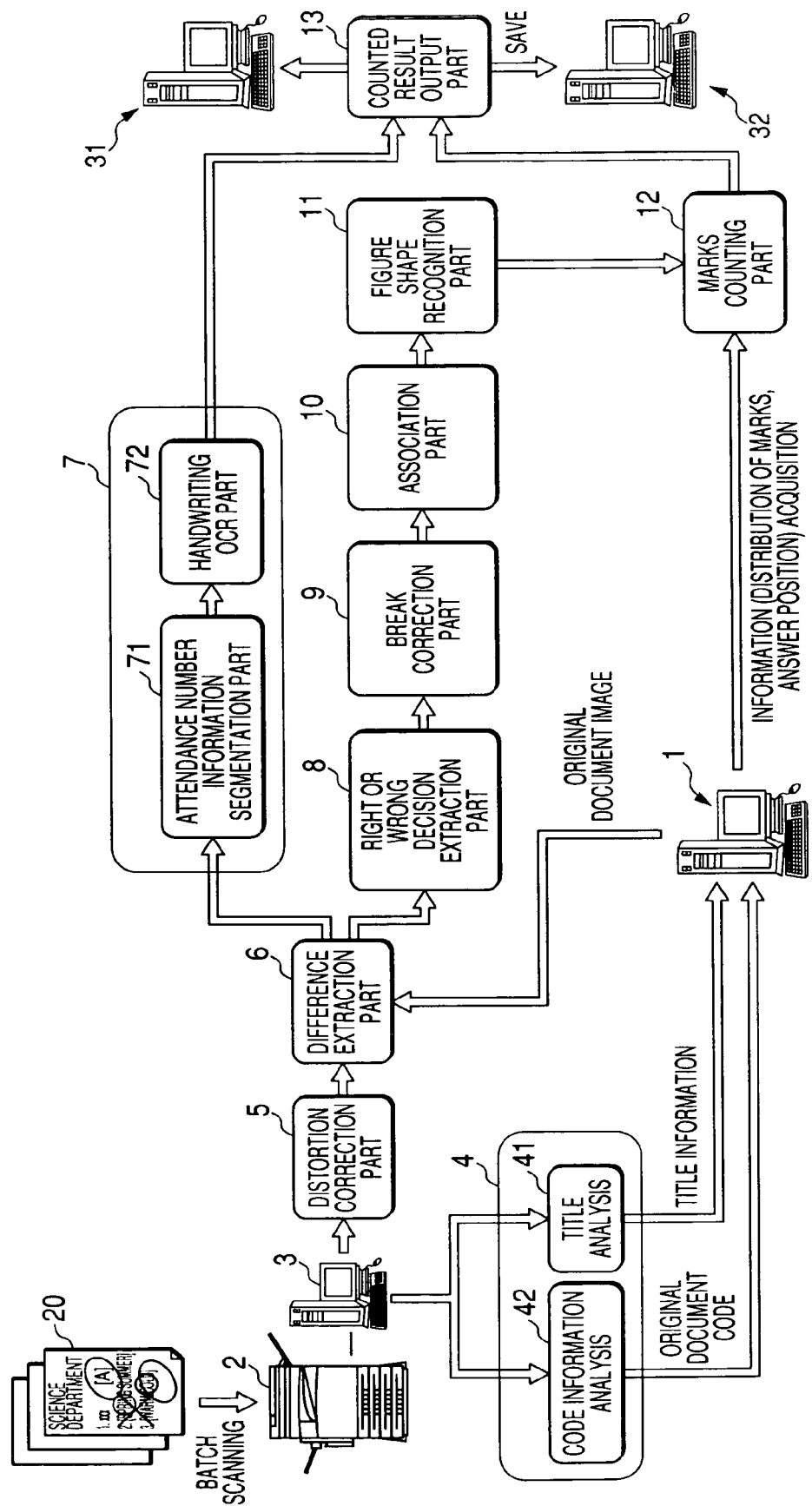
FIG. 1 is a system configuration diagram showing a configuration example of a teaching material processor to which the present invention is applied.

FIG. 1 is a system configuration diagram showing a schematic configuration example of a teaching material processor to which the invention is applied. As shown in FIG. 1, the teaching material processor of this example comprises a database part 1, an image reading part 2, an image data analysis part 3, a teaching material discrimination part 4, a distortion correction part 5, a difference extraction part 6, a solver extraction part 7, a right or wrong decision extraction part 8, a break correction part 9, an association part 10, a figure shape recognition part 11, a marks counting part 12 and a counted result output part 13.

In this teaching material processor, the database part 1 holds and accumulates the electronic data for the educational teaching material.

Figure 2:
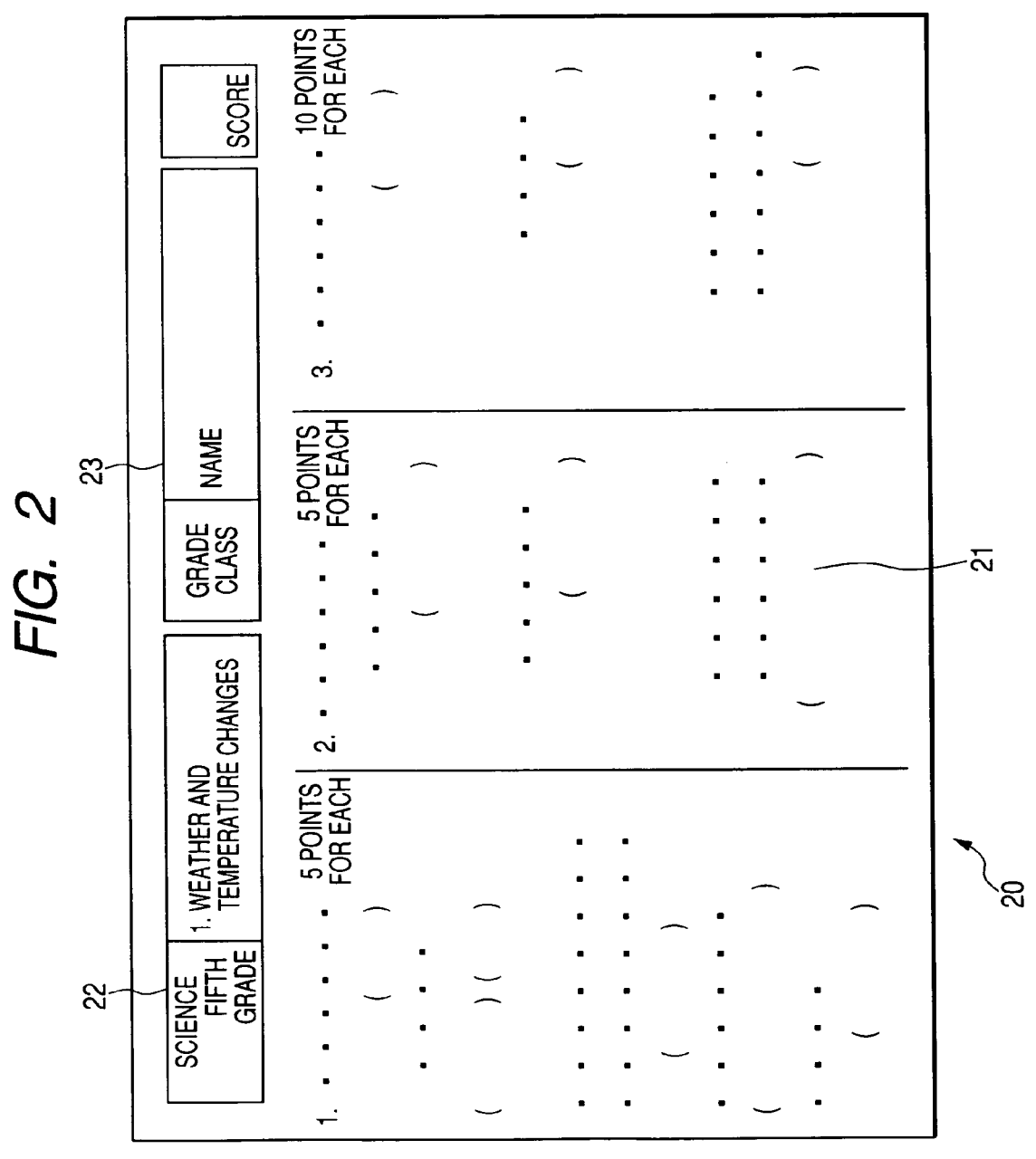

Herein, the educational teaching material will be simply described below. FIG. 2 is an explanatory view showing one specific example of the educational teaching material. As shown in FIG. 2, the educational teaching material 20 is a test answer sheet or exercise sheet used in the educational institution, in which a plurality of problems (questions) and the answer columns 21 for the plurality of problems are described. The educational teaching material 20 is required to include at least the answer column 21, but may not necessarily include the problem sentence.

Also, the educational teaching material 20 is provided with an identification information column 22 describing the information for identifying the educational teaching material 20, and a solver information column 23 describing the information concerning the person who enters the answer into the answer column 21. In the identification information column 22, the information such as a subject, a title and an applied school year of the educational teaching material 20 is already described.

In the identification information column 22, the code information for identifying the educational teaching material 20 may be embedded, in addition to or separately from the information such as subject, title and applied school year. The embedding of the code information may be made employing a well-known technique. One of the specific examples is what is called an "iTone®", which employs a technique of embedding digital image into a halftone image by changing the form (position, shape and so on) of pixels making up a multi-line screen or a dot screen as the gradation representation. On the other hand, the class, attendance number and name of the person who enters the answer can be entered in the solver information column 23.

The electronic data for this educational teaching material 20 can specify the layout of the answer column 21 or the identification information column 22 in the educational teaching material 20, and may take any data format as far as it can be held and accumulated in the database part 1. Specifically, the image data of raster form obtained by reading the image in the image reading part 2 may be stored and held as the electronic data for the educational teaching material 20, for example.

Turning back to FIG. 1, the image reading part 2 corresponds to reading means in this invention, and reads the image for the educational teaching material 20 of reading object, employing a well-known optical image reading technique, to obtain the image data from the educational teaching material 20. The educational teaching material 20 of reading object may include the entry of answer into the answer column 21, entry of the name into the solver information column 23, and additional entry of the check sign (specifically, figure such as "o" or "x") for right or wrong decision to the answer. To store and hold the electronic data in the database part 1, the material having no entry in the answer column 21 and the solver information column 23 (hereinafter referred to as "original document") may be also the reading object in the image reading part 2.

The image data analysis part 3 performs an analysis process for the image data obtained by the image reading part 2. The analysis process include the layout analysis, character figure separation, character recognition, code information recognition, graphics processing, and color component recognition, which may be implemented, employing well-known image processing techniques, and are not described in detail here.

The teaching material discrimination part 4 is composed of at least one of a title analysis part 41 and a code information analysis part 42, and identifies the educational teaching material 20 from which the image data is obtained by the image reading part 2, especially based on the analysis result of at least one of the title analysis by the title analysis part 41 and the code analysis by the code information analysis part 42 for the identification information column 22, as a result of the analysis process in the image data analysis part 3.

At this time, the teaching material discrimination part 4 makes a collation with the electronic data of the educational teaching material 20 held and accumulated in the database part 1, and discriminates the educational teaching material as an identification error, if the corresponding electronic data is not held and accumulated in the database part 1. That is, the teaching material discrimination part 4 specifies the electronic data to be compared with the image data obtained by the image reading part 2 from the analysis result in the image data analysis part 3.

The distortion correction part 5 corrects the image data obtained by the image reading part 2 for an image distortion in the image data. The correction for image distortion involves inclination correction, and expansion or contraction correction in the scanning direction or sub-scanning direction. These distortion corrections may be implemented by the well-known image processing techniques, and are not described in detail here.

The difference extraction part 6 extracts a difference between the image data obtained by the image reading part 2 and subjected to a distortion correction process in the distortion correction part 5 and the electronic data to be compared within the database part 1, based on the identified result of the educational teaching material 20 in the teaching material discrimination part 4. A technique itself for the difference extraction process may be implemented employing the well-known image processing techniques, and is not described in detail here.

The solver extraction part 7 is composed of at least one of an attendance number information segmentation part 71 and a handprinted OCR (Optical Character Reader) part 72, or preferably both, and extracts the solver information on the educational teaching material to be read by the image reading part 2 by extracting the character information in the attendance number information segmentation part 71 or making the character recognition process in the handprinted OCR part 72, with respect to the difference for the solver information column 23 that is extracted by the difference extraction part 6, based on the result of the analysis process in the image data analysis part 3. The solver information may be the information for identifying the person who enters the answer, such as the class, attendance number and name.

The right or wrong decision extraction part 8 corresponds to additional image extraction means of the invention, and extracts the entry content of right or wrong decision as the additional image from the difference extracted by the difference extraction part 6, based on the result of the analysis process in the image data analysis part 3. Herein, the additional information means the image added to the original image, such as the check sign entered (added) for grading by the grader or the teacher for the answer entered in the answer column 21, or the check signal once erased with the double line and entered (added) nearby when the entered check sign is an error.

The check signs for grading may include "o" indicating the correct answer and "x" indicating the incorrect answer, and additionally other signs (figures) such as "Δ" or half circle indicating the partial point. In the following, these signs (figures) are simply denoted as the "right or wrong decision figures". Further, "Δ" is typically employed as the figure of the partial point. Herein, the partial point means the score less than the distribution of marks for the question, for example, half the score of the distribution of marks for the question, by entering the check sign of "Δ" when the answer is neither correct nor incorrect.

In the right or wrong decision extraction part 8, the entry content (right or wrong decision figure) of right or wrong decision may be extracted through a color component recognition process for the extracted result of the difference extraction part 6 by extracting a predetermined color component, for example. Because the entry of right or wrong decision is generally made in red.

The break correction part 9 performs a break correction process for the extracted result of the right or wrong decision extraction part 8. Herein, the break correction process is the process for resolving the break between extracted line segments by connecting the extracted line segments.

The association part 10 corresponds to association means of the invention, and associates the entry content of right or wrong decision that is the additional image extracted by the right or wrong decision extraction part 8 with the answer column 21 in the predetermined area of the educational teaching material 20. The association part 10 further has a function as additional image selection means that selects one of plural additional images under the prescribed decision conditions, when the plural additional images (right or wrong decision figures) are associated with one answer column 21 by association. Two functions of the association and the additional image selection of this association part 10 are the features of the invention, and will be described later in detail.

The figure shape recognition part 11 recognizes the right or wrong decision figure by recognizing the shape of the right or wrong decision figure that is the additional image associated or selected by the association part 10. The shape recognition may be made by pattern matching with the shape of right or wrong decision figure for grading (right or wrong decision).

The marks counting part 12 counts the marks entered in the educational teaching material 20, of which the image is read by the image reading part 2, based on the recognition result of right or wrong decision figure by the figure shape recognition part 11, the result of association by the association part 10 and the information of distribution of marks for each answer column 21 in the educational teaching material 20 included in the electronic data of the educational teaching material 20 held and accumulated in the database part 1.

The counted result output part 13 outputs the result of counting the marks in the marks counting part 12 associated with the solver information extracted by the solver extraction part 7. The output destination of the counted result output part 13 may be a database device 31 or a file server device 32 connected to the teaching material processor, which manages the result of counting the marks for the educational teaching material 20.

Of the above-mentioned components, namely, the database part 1 to the counted result output part 13, the image reading part 2 may be realized employing a copying machine, a composite machine or a scanner device having an image reading function. In this case, when an Automatic Document Feeder (ADF) is appended, the image reading for plural educational teaching materials can be performed successively.

Also, other components than the image reading part 2, namely, the database part 1, the image data analysis part 3 to the counted result output part 13, may be realized employing a computer apparatus such as a PC (personal computer) that executes a predetermined program to implement the information storage processing function, the image processing function and the arithmetical operation processing function.

In this case, the predetermined program required to realize the database part 1, the image data analysis part 3 to the counted result output part 13 may be installed beforehand in the PC. Or the program may not be installed beforehand, but may be stored and provided in a computer readable storage medium, or distributed via wired or wireless communication means. That is, the teaching material processor of the above configuration may be also realized by a teaching material processing program that enables the computer connected to the image reading device to operate as the teaching material processor.

(Processing Procedure of Teaching Material Processing Method)

Figure 3:
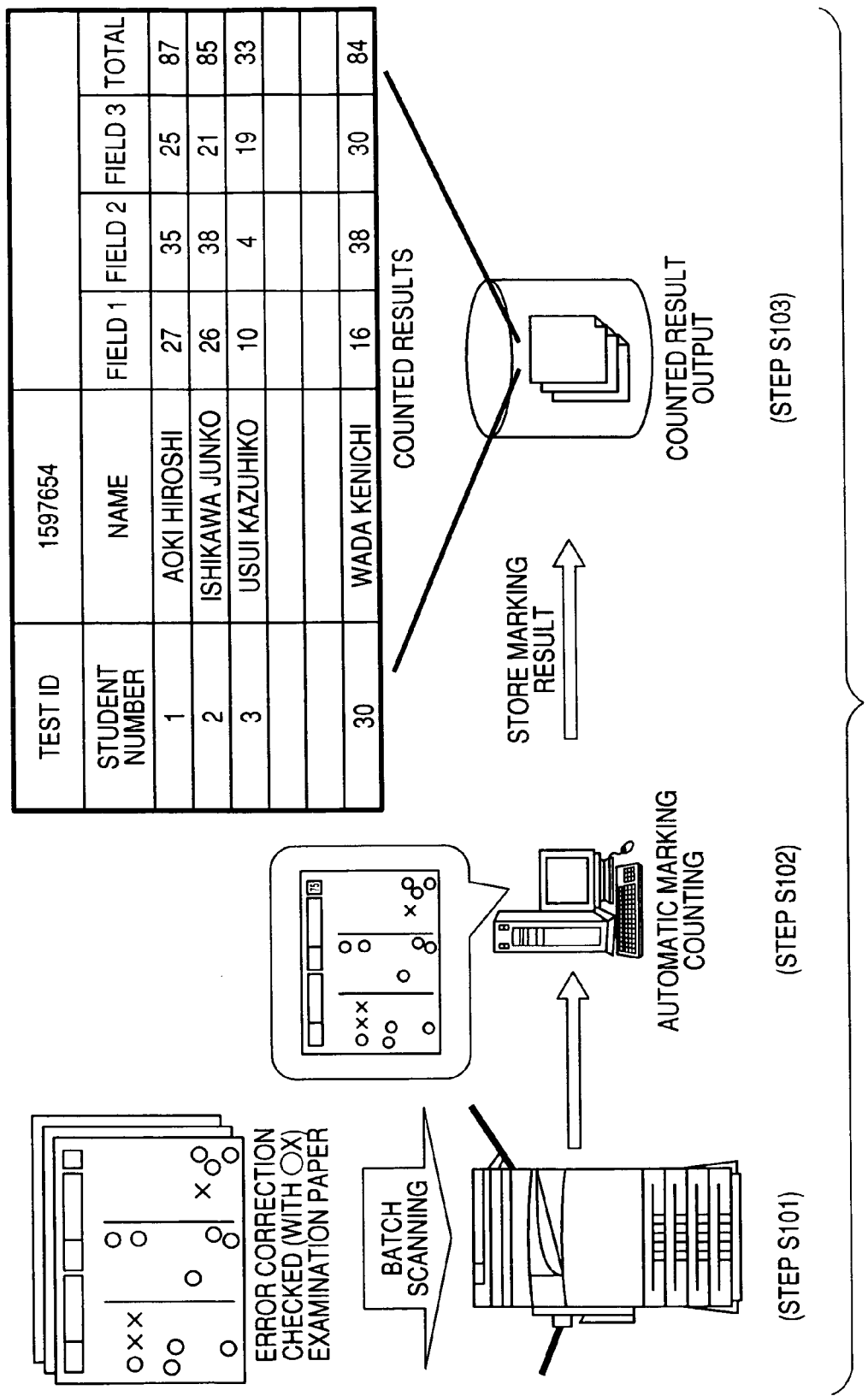
FIG. 3 is an explanatory view showing a processing operation example in the teaching material processor.

Referring to an explanatory view of FIG. 3, one example of the processing procedure on the processing operation in the teaching material processor (which may be realized by the teaching material processing program) as configured in the above way according to this embodiment will be described below. FIG. 3 is an explanatory view showing a processing operation example in the teaching material processor according to this embodiment.

When the teaching material processor is employed, it is supposed that the electronic data of the original document for the educational teaching material 20 subjected to the marks counting process is held and accumulated in the database part 1, and the electronic data includes the answer information having the information of distribution of marks for the educational teaching material 20. The electronic data and the answer information including information of distribution of marks may be registered into the database part 1 by reading the image in the image reading part 2. Because the registration is achieved employing the well-known techniques, its details are not described here.

In the marks counting process, first of all, the solver or the student fills the information of name in the solver information column 23 and enters the answer in the answer column 21. Further, the image reading part 2 reads the image of the educational teaching material 20, for which the grader or the teacher enters (adds) the right or wrong decision figure such as "o" "x" or "Δ", to the answer entered in each answer column 21 to obtain the image data from the educational teaching material 20 (step S101).

At this time, if the ADF is employed, plural educational teaching materials 20 to be collectively processed in one group such as the same class can be subjected to image reading at a time to acquire successively the image data from the educational teaching materials 20. And the image data obtained by the image reading is once stored in the memory used as a work area.

Thereafter, the following automatic grading process is performed for the image data obtained from each educational teaching material 20 (step S102).

That is, the image data analysis part 3 performs the analysis process for the image data obtained from one educational teaching material 20, and the teaching material discrimination part 4 identifies the educational teaching material 20, based on the result of the analysis process. This identification may be performed according to the title analysis of "science", "fifth year", "1. weather and temperature changes", for example, or the code analysis for the code information embedded in the identification information column 22. Through this identification, the teaching material discrimination part 4 can specify the electronic data to be compared with the image data obtained by the image reading part 2.

This identification may be sequentially performed for the plural educational teaching materials 20, of which the image reading part 2 reads the image, but may be made only for the educational teaching material 20 to be firstly processed in the collective processing, because the educational teaching materials 20 to be collectively processed in one group are generally all the same.

If the teaching material discrimination part 4 specifies the electronic data, the database part 1 takes out the corresponding electronic data from the held and accumulated data according to the specified result, and passes it to the difference extraction part 6.

Also, the distortion correction part 5 corrects the image distortion in the image data obtained from one educational teaching material 20. This correction for image distortion is performed to correct the image distortion occurring when the image reading part 2 reads the image to improve the precision of the comparison with the electronic data or the difference extraction.

And the difference extraction part 6 extracts the difference between the electronic data passed from the database part 1 and the image data obtained by the image reading part 2 and corrected for the image distortion by the distortion correction part 5. The entry contents in the solver information column 23 and each answer column 21, and the right or wrong decision figure for each answer column 21 are extracted by this difference extraction.

If the difference extraction part 6 extracts the difference, the solver extraction part 7 extracts the solver information in the educational teaching material to be read by the image reading part 2 through the character recognition process with the difference. Thereby, the class, attendance number and name of the person who enters the answer into the one educational teaching material 20 can be specified.

Also, for the difference extraction result by the difference extraction part 6, the right or wrong decision extraction part 8 extracts the predetermined color component, specifically red component from the difference extraction result to extract the right or wrong decision figure to each answer column 21. The extraction of predetermined color component can be made by paying attention to the color component data composing the image data, if the difference extraction result is composed of the image data.

Generally, the entry of right or wrong decision figure such as "o", "x" or "Δ" on the educational teaching material 20 is often overlapped on the problem sentence, the frame for specifying each answer column 21 or the answer entry content to each answer column 21. Therefore, there is a fear that the extraction result of predetermined color component by the right or wrong decision extraction part 8 excludes the overlapped portion, that is, a break portion occurs in the right or wrong decision figure such as "o", "x" or "Δ". From this, the break correction part 9 performs a break correction process for the extraction result of predetermined color component by the right or wrong decision extraction part 8.

(One Example of Break Correction)

Figure 4:
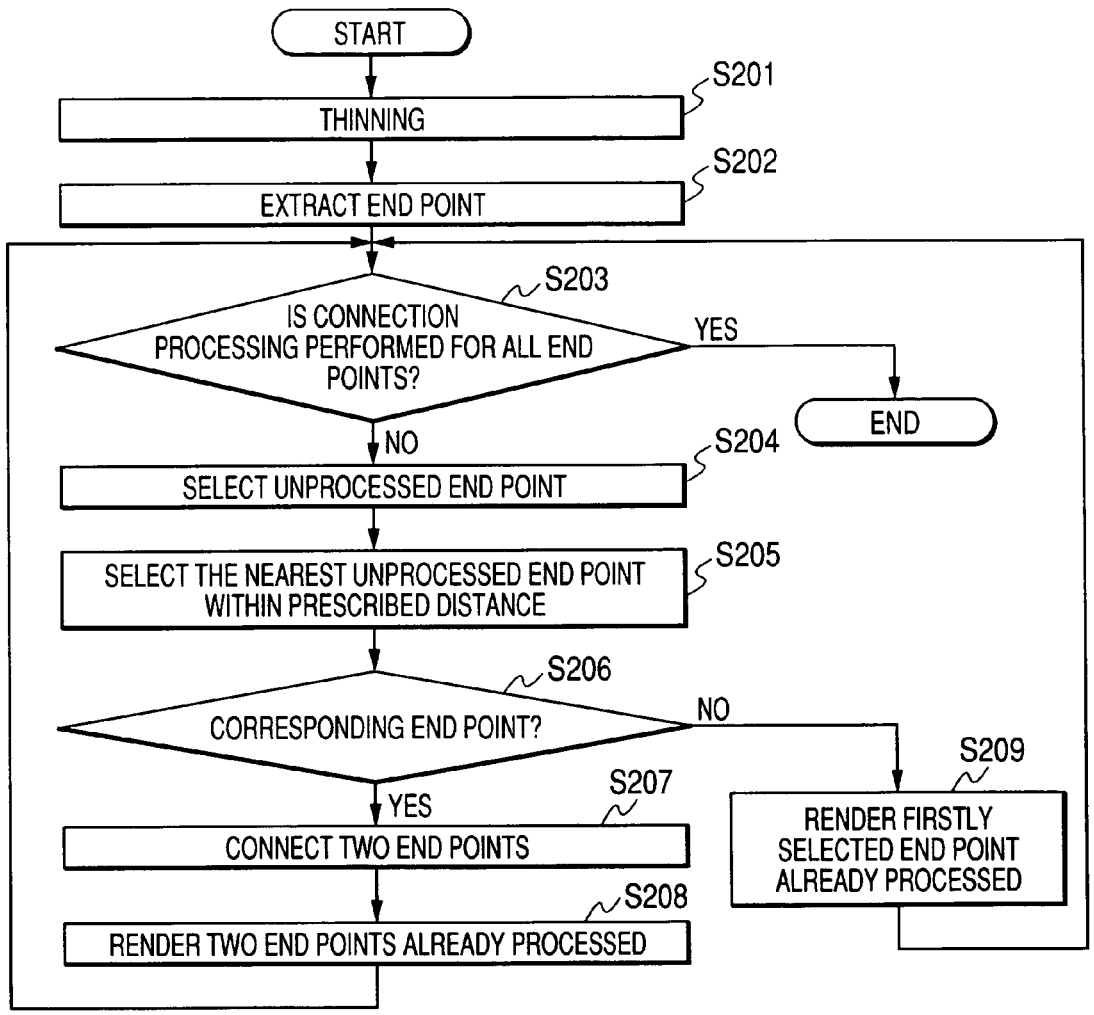
FIG. 4 is a flowchart showing one example of a processing procedure for break correction.

Referring to a flowchart of FIG. 4, a break correction process of the break correction part 9 will be described below. FIG. 4 is a flowchart showing one example of a break correction processing procedure.

In the break correction process, a thinning process is performed for the extraction result of predetermined color component by the right or wrong decision extraction part 8, namely, the extraction result of the right or wrong decision figure such as "o", "x" or "Δ" (step S201). Further, an end point extraction process is performed (step S202). Thereby, if there is any break portion in the right or wrong decision figure such as "o", "x" or "Δ", the endpoint in the break portion is extracted. The thinning process and the end point extraction process may be performed, employing the well-known techniques, and are not described in detail here.

If the end points are extracted, the following process is performed for all the extracted end points, till it is determined that the connection process is already performed (step S203). That is, first of all, one of the unprocessed end points is selected (step S204), an unprocessed end point (hereinafter referred to a "second end point") within a preset prescribed distance from the selected end point (hereinafter referred to as a "first end point") and nearest to the first end point is further selected (step S205).

And it is judged whether or not there is corresponding end point (second end point) (step S206). If there is corresponding end point, the first end point and the second end point are connected to each other (step S207), and then the first end point and the second end point are made already processed (step S208). On the other hand, if the corresponding end point is not the second end point, the connection between end points is not made, and the first end point is made already processed (step S209).

Figure 5:
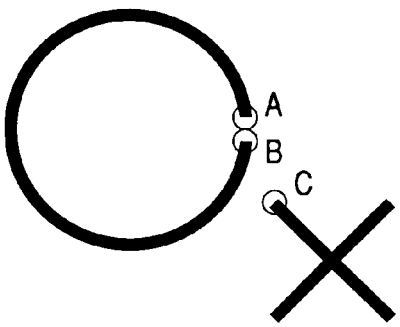
FIG. 5 is an explanatory view of one example of a break correction process.

Such process is repeated for all the end points, till there is noun processed end point (steps S203 to S209). Thereby, if the figure as shown in FIG. 5 is extracted, for example, the end point A is connected to the nearest end point B, even though there are end points B and C within the prescribed distance from the end point A, whereby the break portion in the figure of "o" is corrected.

(Another Example of Break Correction)

Figure 6:
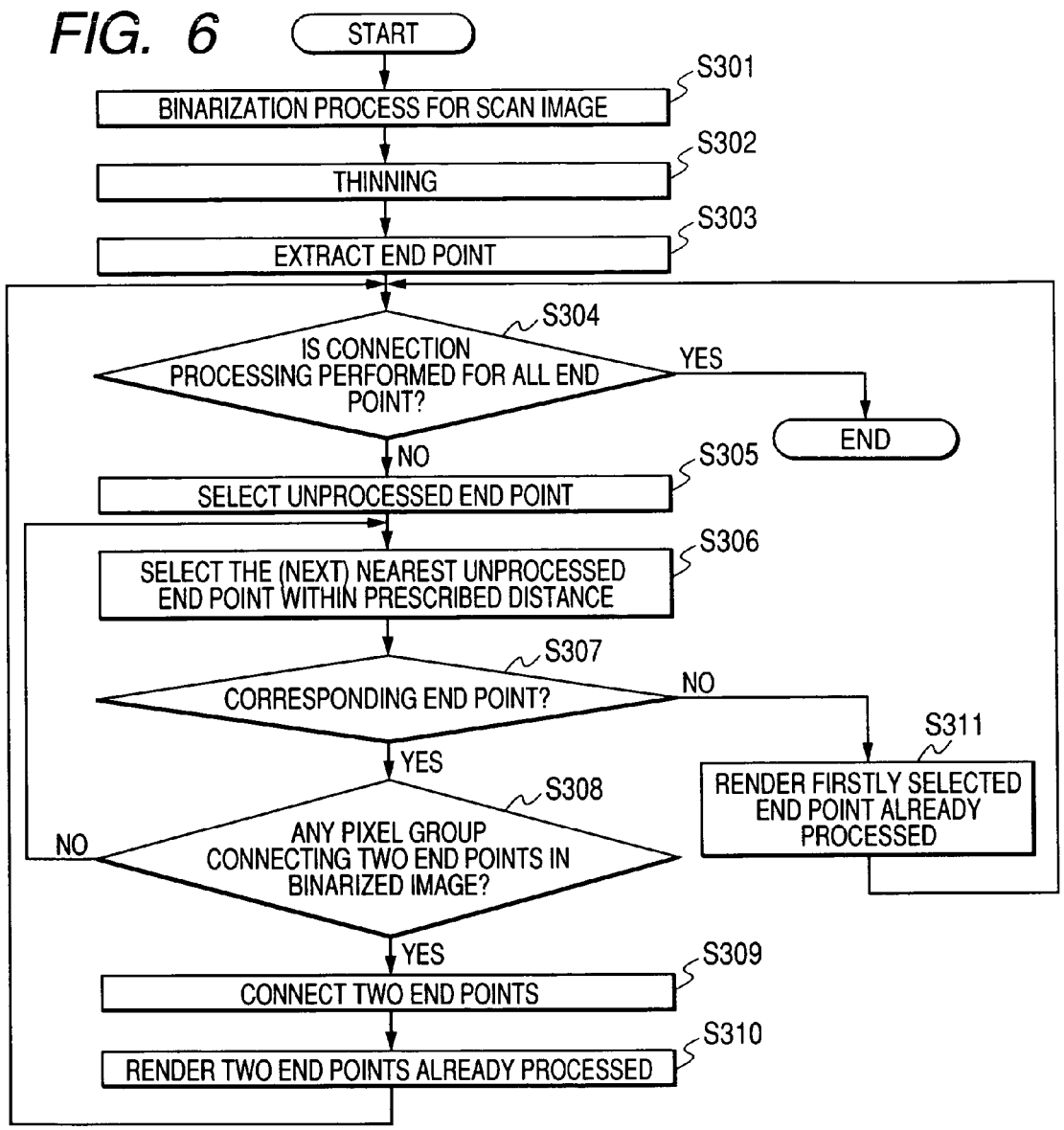
FIG. 6 is a flowchart showing another example of the processing procedure for break correction.

FIG. 6 is a flowchart showing another example of the break correction processing procedure by the break correction part 9. In another example of the break correction process, the precision of the break correction process is improved, employing the image data after the image distortion correction by the distortion correction part 5, besides the extraction result of predetermined color component by the right or wrong decision extraction part 8.

That is, in another example of the break correction process, a binarization process is performed for the image data after the image distortion correction by the distortion correction part 5 (step S301). If the binarization process has been performed in extraction of the difference by the difference extraction part 6 or extraction of predetermined color component by the right or wrong decision extraction part 8, the image data after the binarization process may be employed.

Also, the thinning process is performed for the extraction result of predetermined color component by the right or wrong decision extraction part 8 (step S302), and the end point extraction process is further performed (step S303). And if the endpoints are extracted, the following process is performed for all the extracted end points, till it is determined that the connection process is already performed (step S304).

First of all, one of the unprocessed end points is selected (step S305), and an unprocessed end point within a preset prescribed distance from the selected first end point and nearest to the first end point is further selected as the second end point (step S306). And it is judged whether or not there is corresponding end point (second end point) (step S307).

If there is corresponding endpoint, it is judged whether there is any group of pixels connecting the first end point and the second end point in the image data after the binarization process (step S308). In other words, it is judged whether or not there is any overlapping portion of image causing a break. As a result, if there is overlapping portion, the first end point and the second endpoint are connected to each other (step S309). Then, both the first end point and the second end point are made already processed (step S310).

On the other hand, if there is no overlapping portion, the procedure returns to step S306, where an end point within the prescribed distance from the first end point and next nearest to the first end point is selected as the second end point. At this time, if there is no end point to be selected, the connection between end points is not made, and the first end point is made already processed (step S311). Such process is repeated for all the end points, till there is no unprocessed end point (steps S304 to S311).

Figure 7:
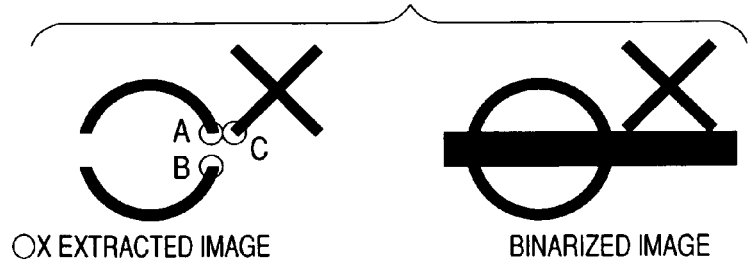
FIG. 7 is an explanatory view of another example of the break correction process.

Thereby, if the figure as shown in FIG. 7 is extracted, the nearest end point C to the end point A is selected, even though there are end points B and C within the prescribed distance from the end point A. However, since there is no group of pixels connecting the end points A and C in the image data after the binarization process, the end points A and C are not connected. Then, the end point B having the nearest distance next to the end point C is selected. Since there is a group of pixels between the end point B and the end point A in the image data after the binarization process, it follows that the end point B and the end point A are connected. That is, "o" and "x" are not connected by mistake, but the break portion in the figure of "o" is corrected.

After the break correction process by the break correction part 9, the association part 10 associates (groups) the right or wrong decision figure extracted by the right or wrong decision extraction part 8 with the answer column 21 on the educational teaching material 20, and selects one of plural right or wrong decision figures under the prescribed decision conditions, when the plural right or wrong decision figures are associated with one answer column 21 by association (object selection).

And if the grouping and object selection are ended in the association part 10, the figure shape recognition part 11 recognizes which the right or wrong decision figure is, "correct answer o", "incorrect answer x" or "partial point Δ", by making the shape recognition for one right or wrong decision figure associated with each answer column 21, that is, the pattern matching with the figure shape of "o", "x" or "Δ". The pattern matching at this time may be performed employing a well-known technique, and is not described here.

In this way, after the association part 10 makes the association between the right or wrong decision figure and the answer column 21 by making the grouping and object selection, the marks counting part 12 counts the marks for right or wrong decision. At this time, the marks counting part 12 adds the distribution of marks specified from the information of distribution of marks for the corresponding question, if the right or wrong decision figure is "o", does not add the distribution of marks for the corresponding question, if the right or wrong decision figure is x", or adds half the distribution of marks for the corresponding question, if the right or wrong decision figure is "Δ". The marks are counted for all the right or wrong decision figures on the educational teaching material 20.

Through the above process, the marks counting part 12 outputs the result of counting the marks for the right or wrong decision entered on the educational teaching material 20 as the marking result for each problem. If the marking result for each problem is outputted from the marks counting part 12, the counted result output part 13 outputs the marking result for each problem, namely, the result of counting the marks by the marks counting part 12, in relation to the solver information extracted by the solver extraction part 7, to the database device 31 or the file server device 32 connected to the teaching material processor (step S103 in FIG. 3). Thereby, in the database device 31 or the file server device 32, the marks counted result for the educational teaching material 20 can be managed or utilized in a list form, for example.

(Rectified Recognition)

Figure 8:
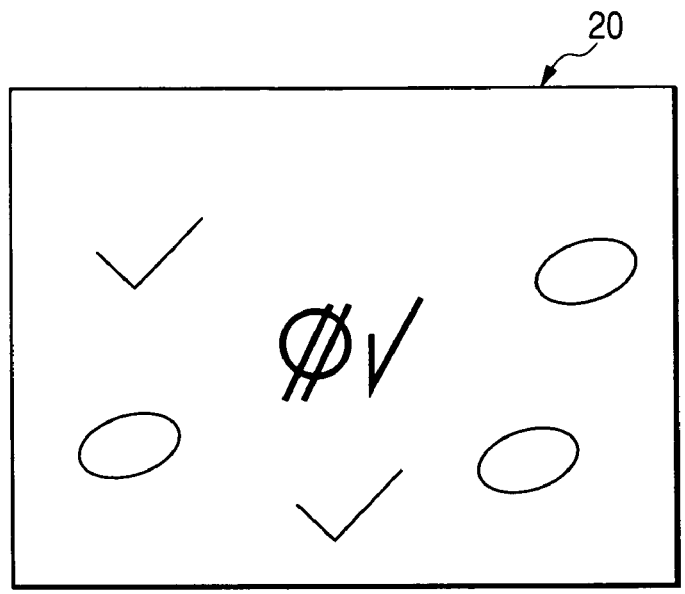
FIG. 8 is an explanatory view showing an example of entering the additional image.

By the way, in grading the educational teaching material 20 where the answer is entered by the solver or the student, when the grader or the teacher should enter the right or wrong decision figure "x" to a certain answer which is incorrect but enters the right or wrong decision figure of "o" by mistake, and notices the wrong entry, the grader or the teacher may draw the double line meaning the rectification on the figure of "o", and additionally enter the right or wrong decision figure of "x" in its neighborhood, as shown in FIG. 8.

Thus, in counting the marks of the educational teaching material 20 for which the additional image is entered, with the right or wrong decision rectified, a technique for recognizing not only the right or wrong decision figure such as "o", "x" or "Δ", but also the additional image after rectification (specifically, right or wrong decision figure such as "o", "x" or "Δ") is a feature of the invention. Three specific examples 1, 2 and 3 are given below. In the following, recognition of the additional image after rectification is called a "rectified recognition".

EXAMPLE 1

Figure 9:
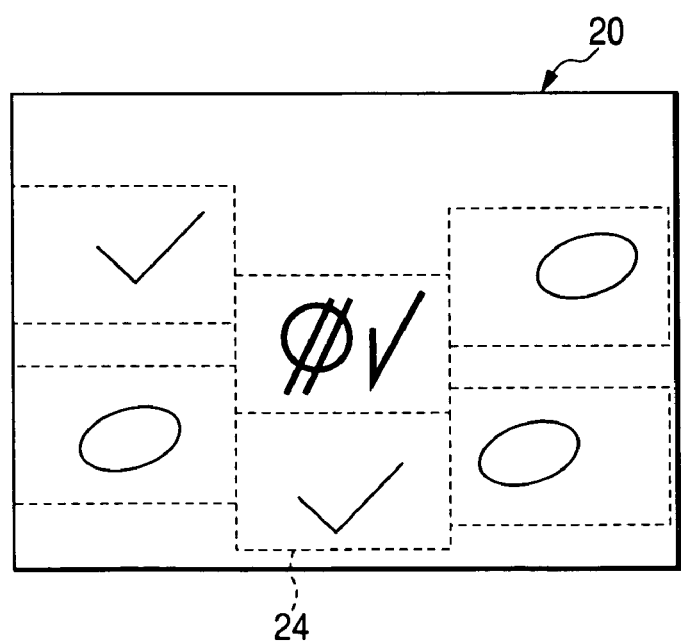
FIG. 9 is an explanatory view showing an educational teaching material in which the marking area is defined.

The rectified recognition in the example 1 premises that a marking area 24 is defined for each problem (question) on the educational teaching material (examination paper) 20 as an area including the answer column 21 in a range where the grader enters the content of right or wrong decision, as shown in FIG. 9. The information of the educational teaching material 20 including the marking area 24 is registered beforehand in the database part 1.

Figure 10:
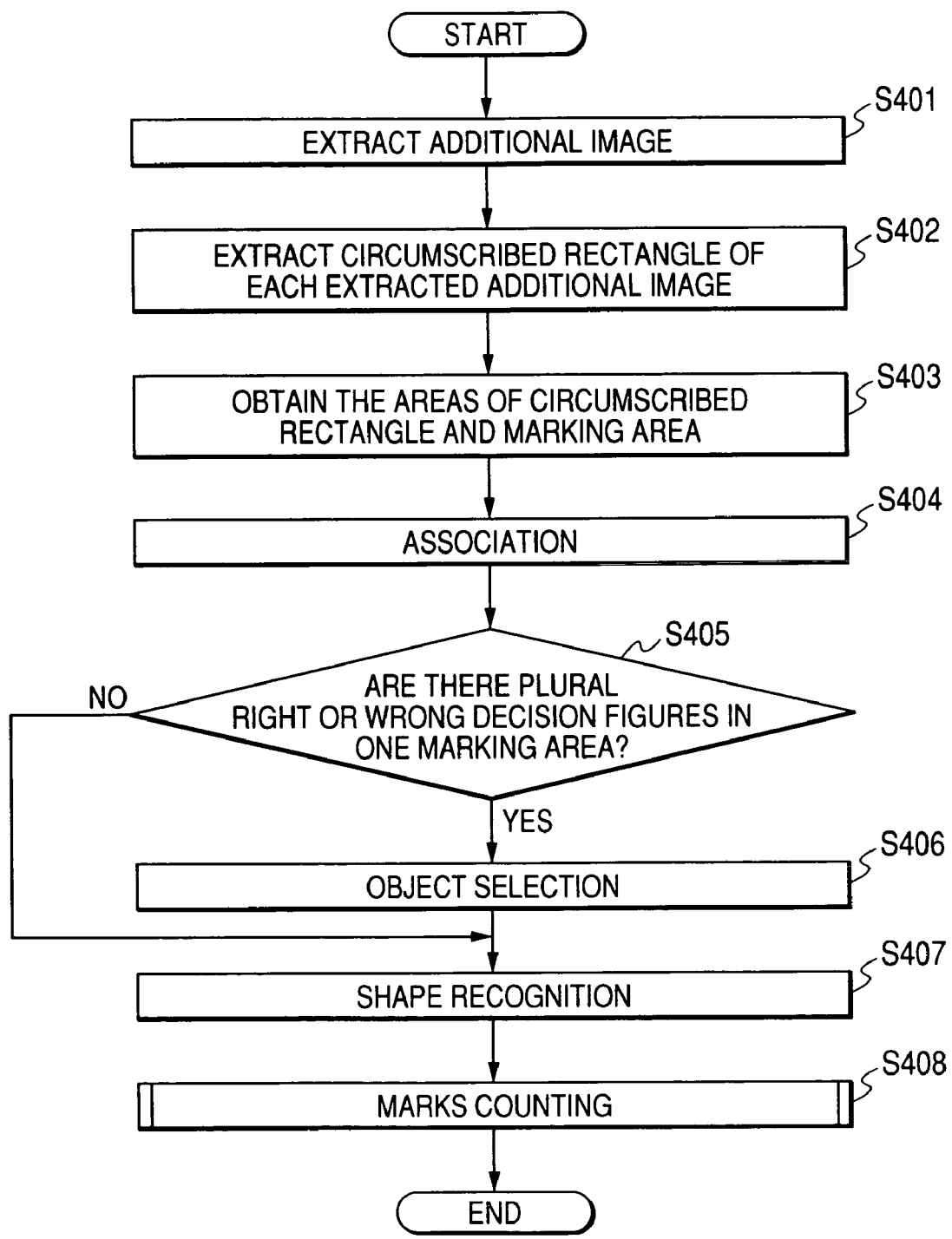
FIG. 10 is a flowchart showing one example of a processing procedure for rectified recognition in an example 1 of the invention.

FIG. 10 is a flowchart showing one example of a rectified recognition processing procedure in the example 1. First of all, the right or wrong decision extraction part 8 extracts the additional image from the difference extraction result of the difference extraction part 6, based on the image data read from the educational teaching material 20 in the image reading part 2 (step S401). The additional image as used herein means the right or wrong decision figure entered into the answer of each answer column 21 in grading by the grader or the teacher, or the right or wrong decision figure newly entered by rectifying the right or wrong decision figure with the double line, viz., the image added to the original image.

Figure 11:
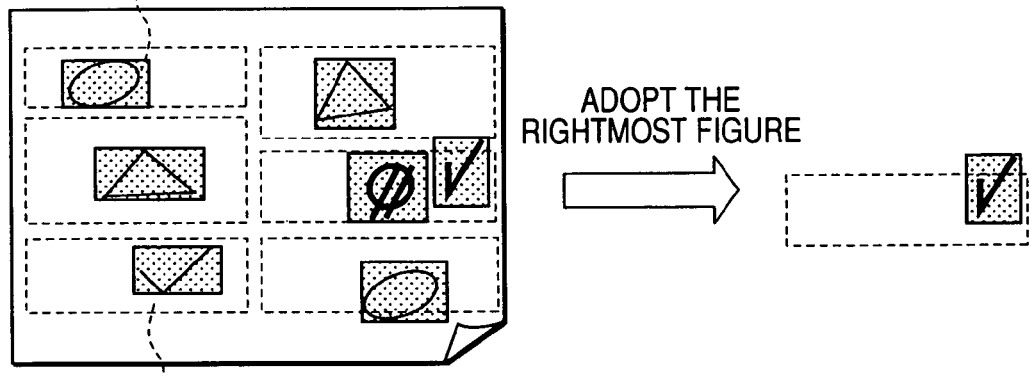
FIG. 11 is an explanatory view of grouping and object selection in the rectified recognition of the example 1.

In the association part 10, the circumscribed rectangle of each extracted additional image is extracted (step S402). Then, each area of the circumscribed rectangle and the marking area 24 is obtained (step S403). And each extracted additional image is associated with the marking area 24 where the overlapping amount of the areas of the circumscribed rectangle and the marking area 24, or the duplicate amount of the circumscribed rectangle and the marking area 24 is the largest (step S404). Thereby, the right or wrong decision figure "o" before rectification and the right or wrong decision figure "x" after rectification are associated (grouped) as the same group with one marking area 24, as shown in FIG. 11.

Next, it is judged whether or not there are plural right or wrong decision figures (additional images) in one marking area 24 (step S405). If there are plural right or wrong decision figures, the right or wrong decision figure located to the rightmost within the marking area 24 is representative of the marking area 24, based on the positional relation between right or wrong decision figures associated with the marking area 24 (object selection) (step S406), as shown in FIG. 11.

Next, the figure shape recognition part 11 recognizes the shape of the right or wrong decision figure for a representative image in each marking area 24 by pattern matching (step S407), and passes its shape recognition result to the marks counting part 12. And the marks counting part 12 counts the marks, based on the shape recognition result (step S408).

If it is determined at step S405 that plural right or wrong decision figures do not exist in one marking area 24, one right or wrong decision figure is directly representative of the marking area 24, whereby the procedure transfers directly to step S407 for the shape recognition of the right or wrong decision figure for the representative image.

(Marks Counting Process)

Figure 12:
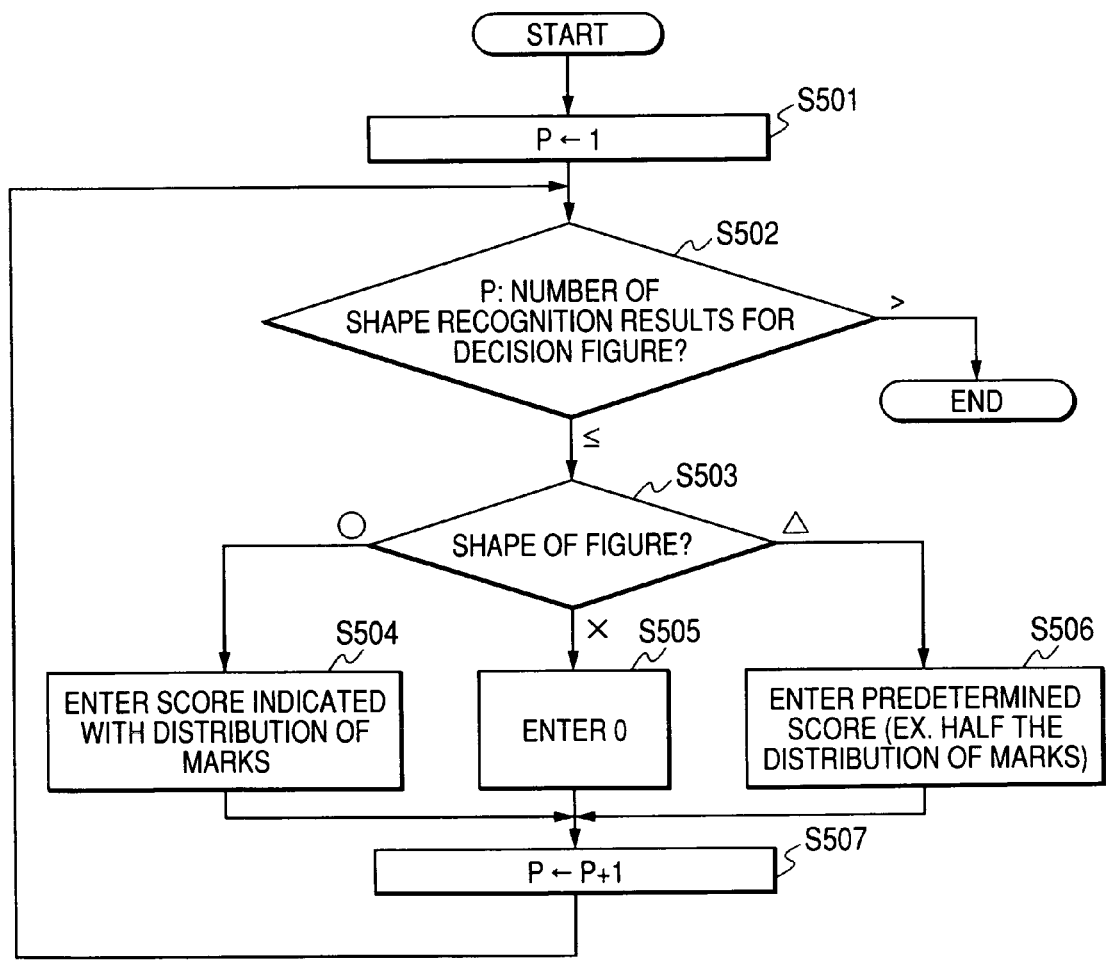
FIG. 12 is a flowchart showing one example of a processing procedure for counting the marks.

The marks counting process in the marks counting part 12 will be described below in detail. FIG. 12 is a flowchart showing one example of the marks counting processing procedure.

First of all, the count number P of right or wrong decision figure is set to "1" (step S501). The following processing is repeated in a step S502 till it is decided that the value of the count number P exceeds the number of shape recognition results of right or wrong decision figure passed from the figure shape recognition part 11. That is, the following processing is performed for each right or wrong decision figure.

Next, the shape of right or wrong decision figure is judged, based on the shape recognition result of the figure shape recognition part 11 (step S503). And if the shape of right or wrong decision figure is "o", the score specified from the information of distribution of marks for the corresponding problem is registered in a counted result table (step S504), if the shape of right or wrong decision figure is "x", the score 0 is registered in the counted result table (step S505), or if the shape of right or wrong decision figure is "Δ" indicating the partial point, the score defined as the partial point, for example, the score of half the distribution of marks, is registered in the counted result table (step S506).

If the registration of the score according to the shape of right or wrong decision figure is ended, the value of the count number P is incremented (step S507). Then, returning to step S502, the processing from steps S503 to S507 is repeated till the value of the count number P exceeds the number of shape recognition results of the right or wrong decision figure.

Figure 13:
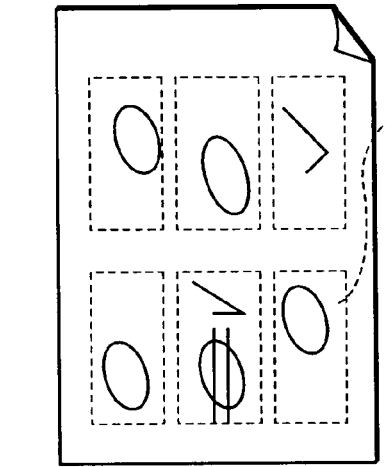
FIGS. 13A-C are explanatory views showing the examination paper information, the examination paper and the output results of the marks counting part.

After the above processing, the marks counting part 12 outputs the result of counting the marks for the right or wrong decision figure entered on the educational teaching material 20 as the marking result for each problem. FIGS. 13A-13C show the examination paper information for the educational teaching material 20, the examination paper where the marking area 24 is defined and the right or wrong decision figure is entered within the marking area 24, and the output result of the marks counting part 12.

EXAMPLE 2

Figure 14:
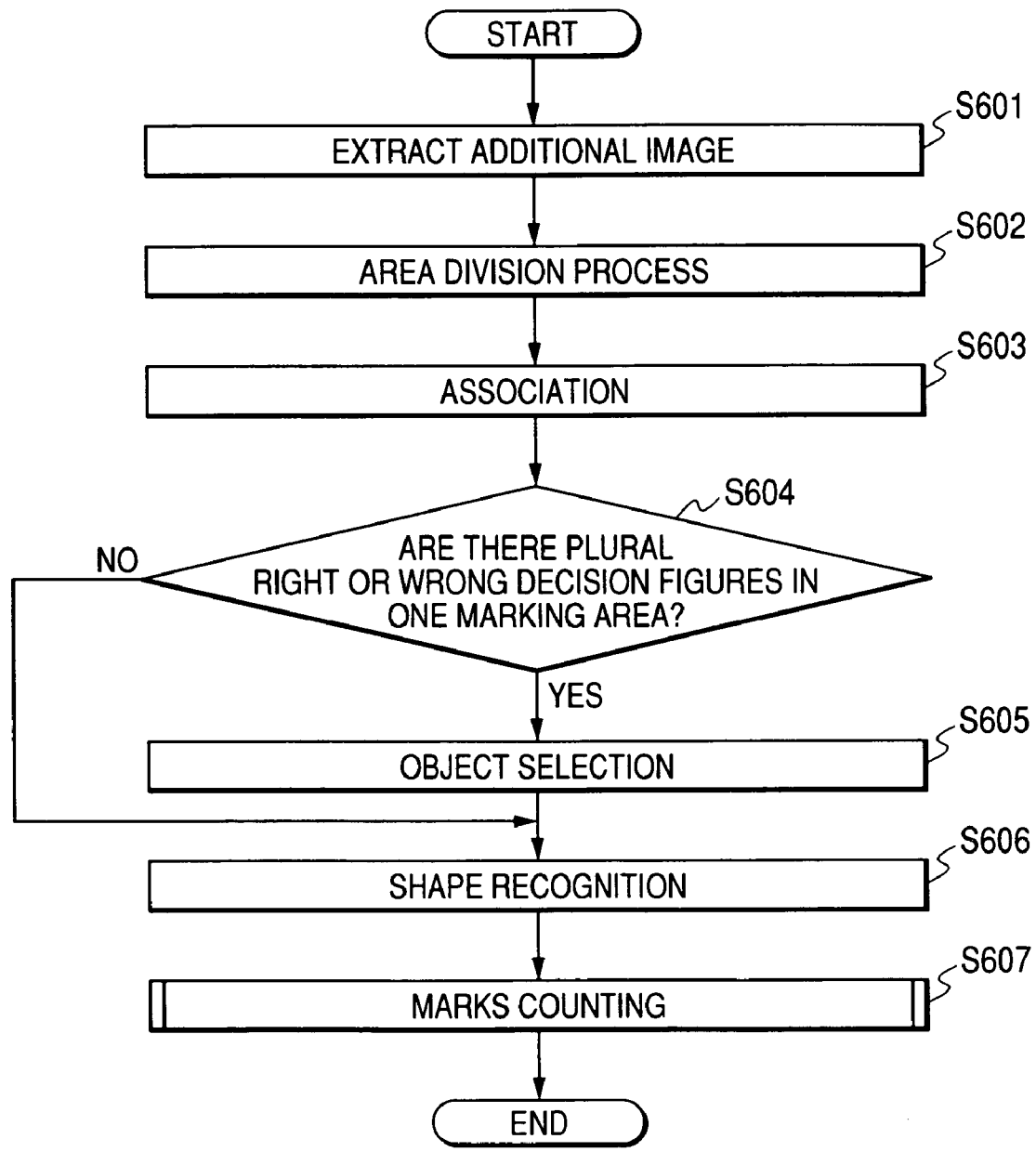
FIG. 14 is a flowchart showing one example of a processing procedure for rectified recognition in an example 2 of the invention.

FIG. 14 is a flowchart showing one example of a rectified recognition processing procedure in the example 2. First of all, the right or wrong decision extraction part 8 extracts the additional image from the difference extraction result of the difference extraction part 6, based on the image data read from the educational teaching material 20 by the image reading part 2 (step S601).

Figure 15:
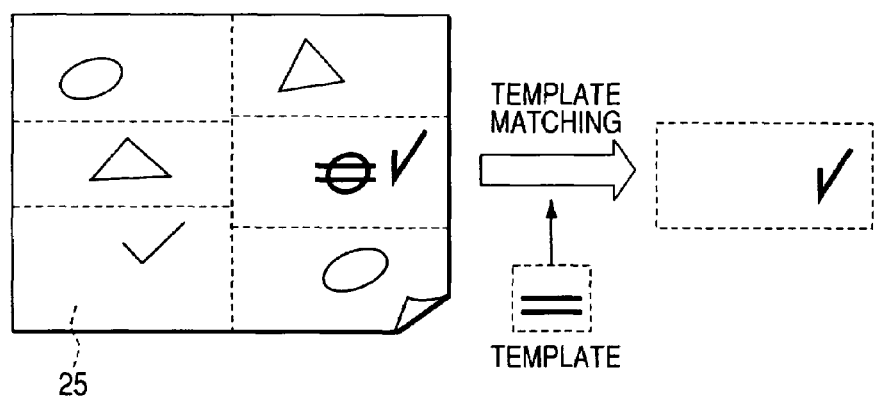
FIG. 15 is an explanatory view of grouping and object selection in the rectified recognition of the example 2.

Then, the association part 10 performs an area division process of dividing the extracted additional image into plural areas (step S602), as shown in FIG. 15. This area division is performed till the number of areas is equal to the number of answer columns, because the number of answer columns (number of questions) is known in advance. Since the division number of areas equals the number of answer columns (division number of areas=number of answer columns), it does not occur that the division number of areas is too greater or smaller than the number of answer columns, whereby the next grouping is securely made.

Then, each divided area 25 is associated with the extracted additional image (step S603). Thereby, the right or wrong decision figure "o" before rectification and the right or wrong decision figure "x" after rectification added to one answer column 21 are associated (grouped) as the same group for the divided area 25 including the answer column 21, as shown in FIG. 15.

Next, it is judged whether or not there are plural right or wrong decision figures (additional images) in one divided area 25 (step S604). If there are plural right or wrong decision figures, the template matching of comparing with a template having the cancel sign image (e.g., double line) is performed, whereby the right or wrong decision figure not including the cancel sign is representative of the divided area 25 (object selection) (step S605).

Figure 16:
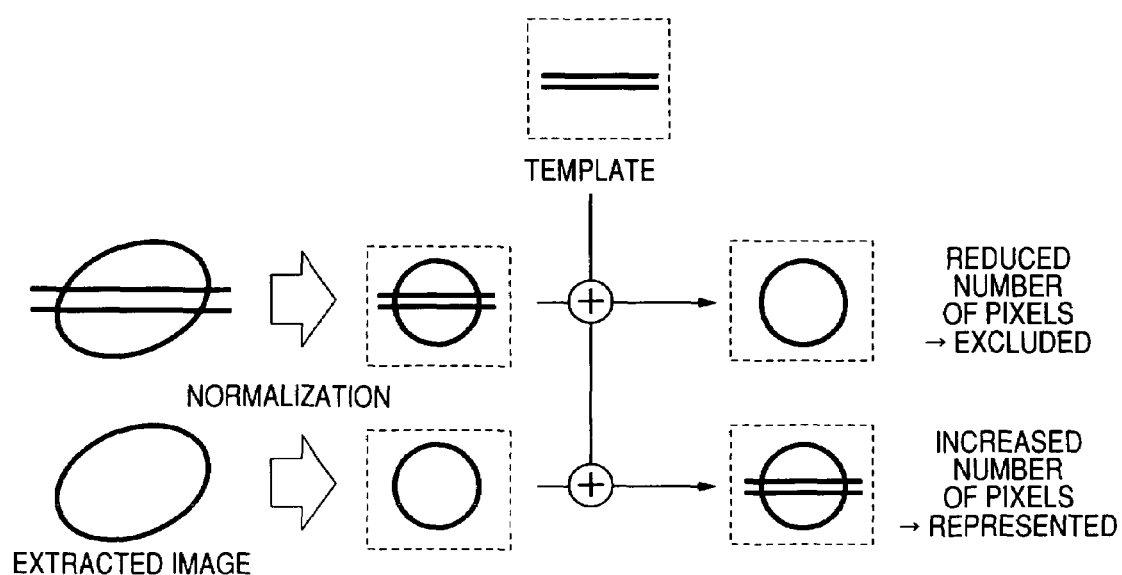
FIG. 16 is an explanatory view showing one specific example of object selection using the template matching.

Referring to FIG. 16, the object selection employing the template matching will be specifically described below. First of all, the size or inclination of the extracted additional image is normalized, and the template having the cancel sign image (e.g., double image) and the additional image are exclusive-ORed at the most matched position. As a result of the exclusive-OR, the additional image with reduced number of pixels is excluded, or the additional image with the most increased number of pixels is representative of the additional image.

Next, the figure shape recognition part 11 performs the pattern recognition for the right or wrong decision figure of the representative image of each divided area 25 by pattern matching (step S606), and passes its shape recognition result to the marks counting part 12. And the marks counting part 12 performs the marks counting process, based the shape recognition result through the processing procedure of FIG. 12 (step S607).

If it is determined at step S604 that there are not plural right or wrong decision figures in one divided area 25, one right or wrong decision figure is directly representative of the divided area 25, whereby the procedure transfers directly to step S606 to make the shape recognition for the right or wrong decision figure of the representative image.

EXAMPLE 3

Figure 17:
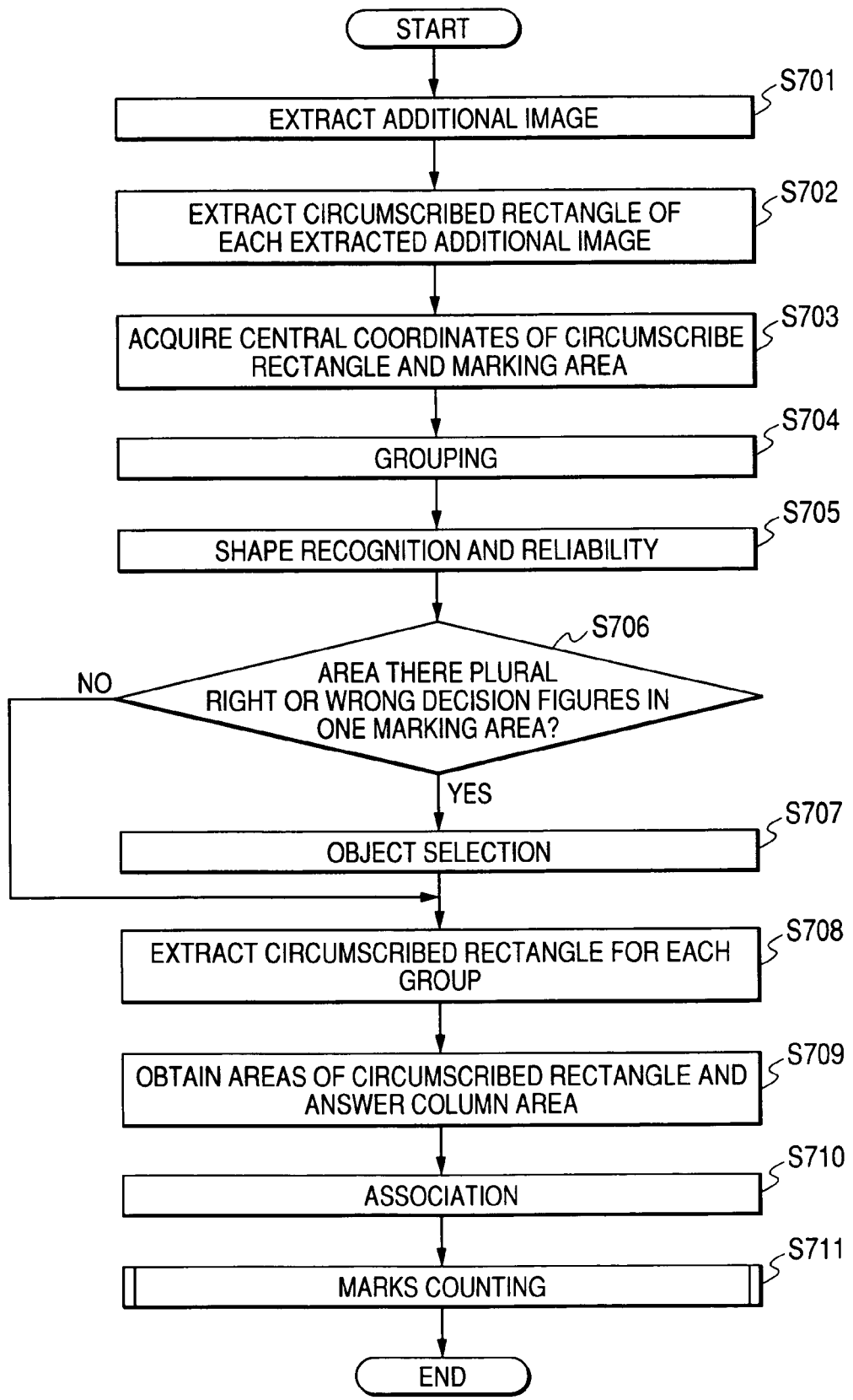
FIG. 17 is a flowchart showing one example of a processing procedure for rectified recognition in an example 3 of the invention.

FIG. 17 is a flowchart showing one example of a rectified recognition processing procedure in the example 3. First of all, the right or wrong decision extraction part 8 extracts the additional image from the difference extraction result of the difference extraction part 6, based on the image data read from the educational teaching material 20 by the image reading part 2 (step S701).

Then, in the association part 10, the circumscribed rectangle of each extracted additional image is extracted (step S702). Then, the center coordinates of the circumscribed rectangle are obtained (step S703). The central coordinates of the circumscribed rectangle are obtained by calculating the xy coordinates of a predetermined point (e.g., left upper vertex) of the circumscribed rectangle, and the width w and height h of the circumscribed rectangle, and calculating the central x coordinates (=x+w/2) and the central y coordinates (=y+h/2) from those calculation results. Then, the distance between the central coordinates of the additional images is obtained, and the additional images having the distance less than a prescribed threshold are grouped (step S704).

Next, the figure shape recognition part 11 recognizes the shape for the associated right or wrong decision figure by pattern matching and acquires the reliability of the shape recognition (step S705). Herein, the reliability of shape recognition is the degree of reliability (precision) of the shape recognition result, in which in the shape recognition of "o", if the "o" is erased with the double line, the reliability of shape recognition as "o" is lower.

Next, in the marks counting part 12, it is judged whether or not there are plural right or wrong decision figures (additional images) in one group (step S706). If there are plural right or wrong decision figures, the right or wrong decision figure having the highest reliability is representative of the answer column area 26 by referring to the reliability of shape recognition acquired at step S705 (object selection) (step S707).

Figure 18:
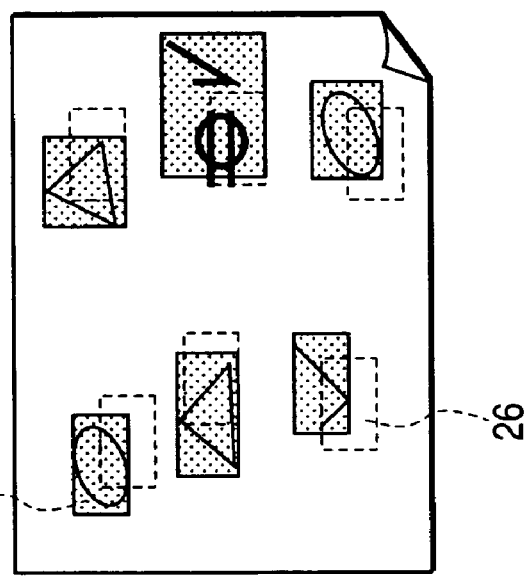
FIG. 18 is an explanatory view of object selection and association in the rectified recognition of the example 3.

Next, the circumscribed rectangle of grouped right or wrong decision figure is extracted (step S708), as shown in FIG. 18. Then, the area of the extracted circumscribed rectangle and the area of the answer column area 26 including the answer column 21 are obtained (step S709). And each extracted additional image is associated with the answer column area 26 in which the overlapping amount of the areas of the circumscribed rectangle and the answer column area 26, namely, the duplicate amount of the circumscribed rectangle and the answer column area 26 is the largest, and the recognition result is registered (step S710).

And the marks counting process is performed based on the shape recognition result through the processing procedure of FIG. 12 (step S711). If it is determined at step S706 that there are not plural right or wrong decision figures in one group, the procedure transfers directly to step S708.

In the example 3, the marks counting part 12 has a function as association means of the invention.

In the example 1 as described above, the grouping is made according to the duplicate amount of the circumscribed rectangle of each extracted additional image and the marking area 24 including the answer column 21, and if there are plural additional images in one marking area 24, the object selection is made according to the positional relation between additional images. In the example 2, the grouping is made by dividing the area of each extracted additional image, and if there are plural additional images in one divided area 25, the object selection is made by template matching. And in the example 3, the grouping is made according to the distance between the central coordinates of each extracted additional image, and if there are plural additional images in one group, the object selection is made according to the reliability of shape recognition, and the association is made according to the duplicate amount of the circumscribed rectangle and the answer column area 26 in the group.

A combination of the grouping and the object selection in the examples 1 to 3 is only illustrative, but the invention is not limited to those combinations, whereby other combinations of the grouping and the object selection of the examples 1 to 3 may be taken.

In the teaching material processor, the teaching material processing method or the teaching material processing program as described above, a difference between the image data read from the educational teaching material 20 where the right or wrong decision is entered, and the electronic data for the educational teaching material 20, namely, the data without entry of the answer into the answer column 21 and entry of the right or wrong decision for the answer, is obtained, and the entry content of right or wrong decision is recognized from the difference to count the marks of right or wrong decision. Therefore, if the image for the educational teaching material 20 where the right or wrong decision is entered is read, the automatic counting process for the marking result can be performed for the entered right or wrong decision figure, whereby the marking process of the educational teaching material 20 is saved in the labor.

Since the image data read from the educational teaching material 20 is based on, if as can function of the copying machine, composite machine, or scanner device, an information storage processing function of the computer apparatus such as PC, an image processing function and an arithmetical operation processing function are provided, the apparatus configuration is implemented without need of a dedicated component.

That is, in the teaching material processor, the teaching material processing method or the teaching material processing program according to the embodiment, the marking process for the educational teaching material 20 employed in the educational institution is saved in the labor, further no dedicated component is needed in the marking process, and the universality for the educational teaching material 20 to be treated is sufficiently secured. Accordingly, the marking process is very convenient and reliable to be employed in the educational institution, and can be smoothly performed.

Also, in the teaching material processor, the teaching material processing method or the teaching material processing program according to the embodiment, both the entry figure shape and entry position of the right or wrong decision are recognized as the entry content of the right or wrong decision, and further the marks of the right or wrong decision are counted with the recognition results of the entry figure shape and entry position corresponding to the positional information and the information of distribution of marks for the answer column 21 included in the electronic data.

That is, since the entry position of the right or wrong decision is calculated, and associated with the positional information of the answer column 21, the marks of the right or wrong decision entered in the educational teaching material 20 can be counted without regard to the layout of the answer column 21 on the educational teaching material 20. Further, since not only the positional information but also the information of distribution of marks are associated, the marks of the right or wrong decision can be counted for the educational teaching material 20 where the distribution of marks is different with the answer column 21.

Particularly, in the teaching material processor, the teaching material processing method or the teaching material processing program according to the embodiment, in making the marking process, if there occurs a situation where the grader or the teacher enters the right or wrong decision figure of "o" to a certain answer by mistake, though the answer is incorrect, notices the wrong entry, and enters the right or wrong decision figure of "x" in its neighborhood by drawing the double line meaning the rectification on the figure of "o" (the additional image is rectified and further additional image is added nearby), the right or wrong decision figure of the extracted additional image and the answer column 21 of predetermined area are associated, and when plural additional images are associated with one answer column 21 by this association, one of the plural additional images is selected under the prescribed decision conditions to discriminate the additional image before rectification and the additional image after rectification, whereby the additional image after rectification can be securely recognized. That is, since the additional image after rectification can be securely recognized for the educational teaching material of paper script, the workability of the marking process is improved, and the marking process is highly reliable.

In the above embodiment, the specific examples of the invention are given above, but the invention is not limited to those examples. For example, the distortion correction process and the break correction process are not necessarily required.

Though in the above embodiment, the teaching material processor, the teaching material processing method, and the teaching material processing program have been described above as the image recognition device, the image recognition method, and the image recognition program, the invention is not limited to the application to them, but may be applied to the image recognition device, the image recognition method and the image recognition program in which the image such as character or figure entered in the paper is read and recognized.

Further, while the marking of test papers is done to enter the figure (O) for a correct answer and the figure (X) for an incorrect answer in the embodiment as above, another figures may be used. For example, a check mark can be used for a correct answer.

As such, in the invention, various changes or modification of the above embodiment may be made without departing from the spirit or scope of the invention.

The entire disclosure of Japanese Patent Application No. 2005-242025 filed on Aug. 24, 2005 including specification, claims, drawings and abstract is incorporated herein by reference in its entirety.

What is claimed is:

1. An image recognition apparatus, comprising:
   a reading unit that reads an image on a paper script to acquire the image data from the paper script;
   an additional image extraction unit that extracts an additional image added to each predetermined area of an original image from the difference extraction result by taking a difference between an image data of the original image on the paper script and the image data acquired by the reading unit;
   an association unit that associates the additional image with the predetermined area; and
   an additional image selection unit that selects one of a plurality of additional images under prescribed decision conditions, when the plurality of additional images are associated with one predetermined area in accordance with an association made by the association unit.

2. The image recognition apparatus according to claim 1, wherein the association unit makes the association in accordance with an amount of duplication between the additional image and the predetermined area.

3. The image recognition apparatus according to claim 1, wherein the association unit makes the association by dividing the additional image into a plurality of areas through an area division process.

4. The image recognition apparatus according to claim 1, wherein the association unit makes grouping in accordance with distances between a central coordinates of each of the additional images.

5. The image recognition apparatus according to claim 1, wherein the additional image selection unit selects one of the additional images based on a positional relation between the additional images, when the plurality of additional images are associated with one predetermined area by the association unit.

6. The image recognition apparatus according to claim 1, wherein the additional image selection unit selects one of the additional images by template matching of comparing the plurality of additional images with a template having a cancel sign image, when the plurality of additional images are associated with one predetermined area by the association unit.

7. The image recognition apparatus according to claim 4, wherein the plurality of additional images are grouped into one group by the association unit, the additional image selection unit selects one of the additional images in accordance with a reliability of shape recognition for the plurality of additional images, and associates the selected additional image with a predetermined area having the greatest amount of duplication between a circumscribed rectangle of the group and the predetermined area.

8. An image recognition method, comprising:
   reading an image on a paper script to acquire an image data from the paper script;
   extracting an additional image added to each predetermined area of an original image from a difference extraction result by taking a difference between an image data of the original image on the paper script and the image data acquired at the reading step;
   associating the additional image with the predetermined area; and
   selecting one of a plurality of additional images under prescribed decision conditions, when the plurality of additional images are associated with one predetermined area in accordance with an association result at the associating step.

9. A program product for enabling a computer to perform an image recognition, comprising:
   software instructions for enabling the computer to perform predetermined operations; and
   a computer-readable recording medium bearing the software instructions;
   wherein the predetermined operations include:
   extracting an additional image added to each predetermined area of an original image on a paper script from a difference extraction result by taking a difference between an image data of the original image and an image data acquired by reading an image on the paper script;
   associating the additional image with the predetermined area; and
   selecting one of a plurality of additional images under prescribed decision conditions, when the plurality of additional images are associated with one predetermined area in accordance with an association result at the associating step.

* * * * *